United States Patent [19]
Haas et al.

[11] 3,877,706
[45] Apr. 15, 1975

[54] MECHANICAL SEAL ASSEMBLY FOR GLASS-LINED MIXER TANKS

[75] Inventors: Leonard L. Haas, West Chester, Pa.; Seymour Schlosberg, East Brunswick, N.J.

[73] Assignee: Philadelphia Gear Corporation, King of Prussia, Pa.

[22] Filed: Oct. 23, 1973

[21] Appl. No.: 408,825

[52] U.S. Cl. .................... 277/41; 277/63; 277/93
[51] Int. Cl. ............................................. F16j 15/34
[58] Field of Search ............................ 277/38–43, 277/58–63, 81, 93, 93 SD

[56] References Cited
UNITED STATES PATENTS

| | | | |
|---|---|---|---|
| 2,531,079 | 11/1950 | Payne | 277/61 |
| 2,662,480 | 12/1953 | Cliborn | 277/39 |
| 2,836,440 | 5/1958 | Brumagim | 277/62 |
| 3,079,605 | 2/1963 | Thomas et al. | 277/61 |
| 3,484,113 | 12/1969 | Moore | 277/62 |
| 3,582,089 | 6/1971 | Amorese | 277/38 |
| 3,591,188 | 7/1971 | Eisner | 277/62 |
| 3,743,302 | 7/1973 | Bach | 277/38 |

Primary Examiner—Richard E. Aegerter
Assistant Examiner—Robert I. Smith
Attorney, Agent, or Firm—Paul & Paul

[57] ABSTRACT

A mechanical seal cartridge for a rotating agitator shaft which enters through an opening in the wall of a mixer tank or other vessel containing corrosive fluids is so designed and constructed that no vulnerable parts are exposed to corrosion attack by the corrosive fluid or environment. The component parts of the seal cartridge are supported as a unit package from a single top component and the package is removable as a unit by pulling it up slidingly along the shaft.

10 Claims, 3 Drawing Figures

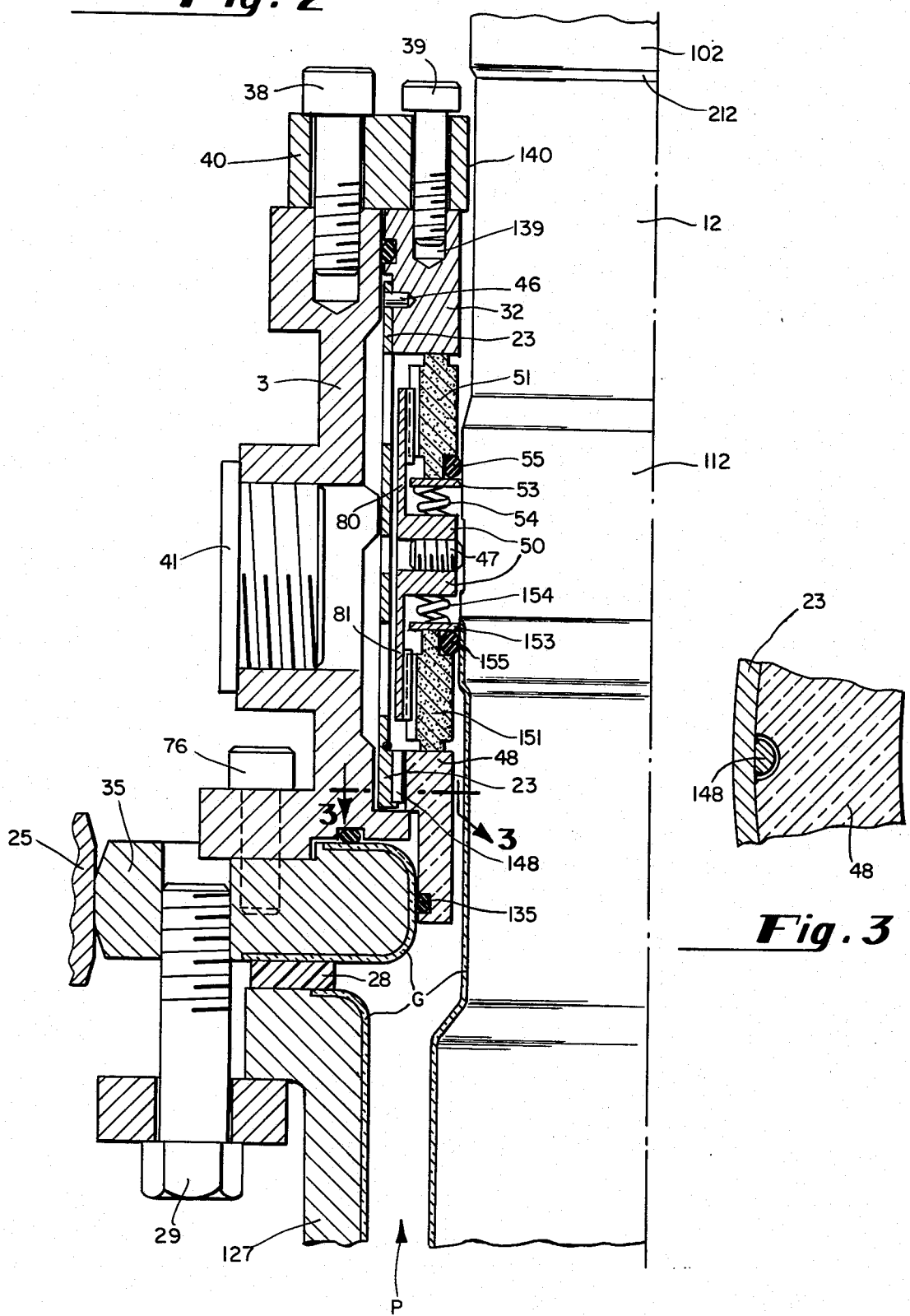

MECHANICAL SEAL ASSEMBLY FOR GLASS-LINED MIXER TANKS

BACKGROUND OF THE INVENTION

This invention relates to mixer tanks or other vessels which contain corrosive fluids or other corrosive substances.

The invention is particularly applicable to glass-lined mixer tanks and other vessels containing corrosive substances having a rotating agitator shaft which projects through a wall, particularly the top wall, of the vessel, as in a top-entering mixer.

The invention relates specifically to a package rotary mechanical seal cartridge for use on rotating agitator shafts of glass-lined mixer tanks and other vessels and which is removable as a unit for replacement and/or repair.

Efforts have heretofore been made to design package rotary seal assemblies for the rotating shafts of glass-lined mixing tanks or other vessels containing corrosive fluids or other corrosive chemicals or substances. In some of these prior art structures, exotic corrosive-resistant metals, such as one of the Hastelloys, have been employed for some of the component parts including the mechanical seal housing, the mechanical seal sleeve which rotates with the shaft, and other parts. In other prior art designs and construction, the shape or contour of one or more component parts, for example, the lower end of the seal-assembly sleeve, have been modified to provide rounded edges which may be glass coated. This necessitated the use of a ceramic insert for an O-ring seal to seal the sleeve against the rotating shaft. Such a construction is shown in U.S. Pat. No. 3,582,092.

SUMMARY OF THE INVENTION

A principal purpose of the present invention is to provide, for a glass-lined mixer tank or other vessel containing corrosive fluids or other substances, an improved package rotating-shaft mechanical seal cartridge is which only non-vulnerable parts are exposed to corrosive attack by the corrosive fluids or substances.

Another object is to provide an improved unit package rotating-shaft mechanical seal cartridge which avoids or minimizes the use of expensive exotic metals, such as the corrosion-resistance Hastelloys, wherein no vulnerable parts are exposed to the corrosive fluids and the package seal cartridge is removable as a unit by sliding it along the shaft.

The foregoing as well as other objects and advantages of the present invention are achieved by designing and constructing a package mechanical seal cartridge for a rotating shaft which includes a holder which is supported on the agitator shaft for rotation therewith and which includes upper and lower collar portions at a spaced distance from the rotating shaft, forming upper and lower annular spaces which receive upper and lower rotating carbon seal faces which are spring pressed against upper and lower stationary seal seats. An outer spacer-and-support sleeve supports all of the component parts of the cartridge from the upper stationary seal seat, and the cartridge is removable as a unit by sliding it upwardly along the shaft.

BRIEF DESCRIPTION OF THE DRAWINGS

FIG. 2 is an enlarged elevational view, mostly in sectiton, showing the details of mechanical seal assembly on one side of the axial center line of the agitator shaft.

FIG. 3 is a view, in section, along the line 3–3 of FIG. 2.

DETAILED DESCRIPTION OF THE PREFERRED EMBODIMENTS

Figure 1:
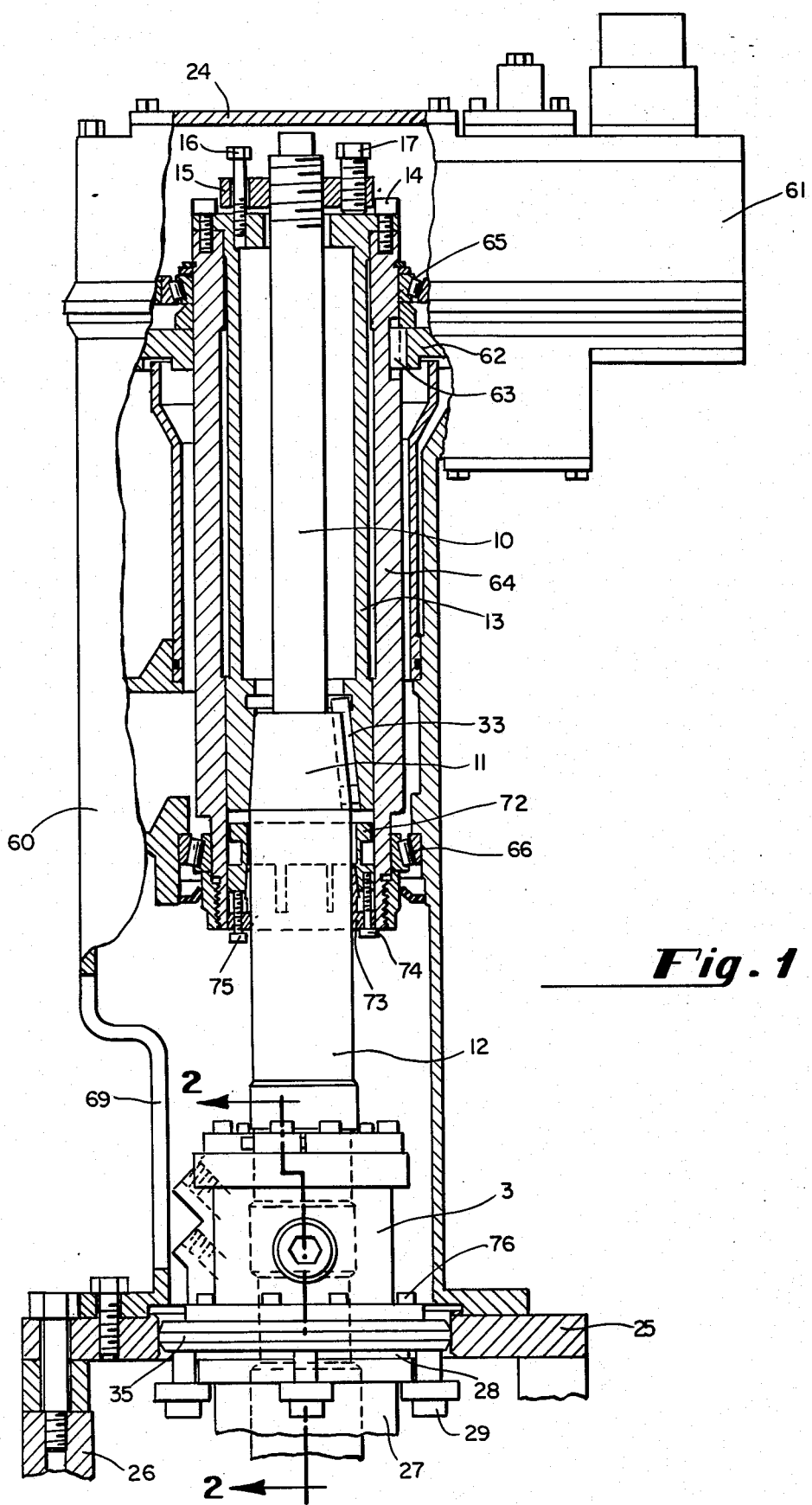
FIG. 1 is an elevational view, largely, in section, showing the drive for the agitator shaft for a mixing tank and showing the position the mechanical seal housing.

Referring now to FIG. 1, projecting upwardly from the top wall or cover of a mixing tank (not shown) are a plurality, for example, four mounting bosses or posts 26, only some of which are seen in FIG. 1. These posts 26 support a metal plate 25 which functions as the drive stand for the drive housing 60. This drive housing 60 is shown in FIG. 1 to be bolted to the drive stand 25 by bolts 30.

Drive housing 60 supports a sub-housing 61 which houses a reversible oil pump and reduction gearing which drives a pinion which drives a gear 62 which is keyed, as by key 63, to a quill sleeve 64 which is supported for rotation in the drive housing 60 as by upper and lower sets of thrust bearings 65 and 66.

Positioned concentrically within the quill sleeve 64, and supported thereby, as by the cap screws 14, is a quill shaft 13.

Positioned within the hollow quill shaft 13 is a draw bar 10, the upper end of which is threaded for receiving a lock nut 15. The lower end portion of draw bar 10 is externally threaded (not shown) and is screwed into the tapered upper end 11 of the agitator shaft 12. A key 33 connects the tapered upper end 11 of the agitator shaft 12 to the lower portion of the quill shaft 13.

A set of jack screws 17 are threaded into lock nut 15 and bear on the upper end of quill shaft 13. When turned downwardly, screws 17 draw the lock nut 15 and the draw bar 10 upwardly relative to the quill shaft 13 thereby wedging the tapered upper portion 11 of the agitator shaft 12 tightly into key 33, thereby tightly locking together the quill shaft 13 and the agitator shaft 12.

it will be seen that when gear 62 is driven rotationally by the drive housed in sub-housing 61, the quill sleeve 64 and quill shaft 13 are driven, which through key 33 drive the agitator shaft 12.

As seen in FIG. 1, quill sleeve 64 extends downwardly beyond the lower end of quill shaft 13 leaving an annular space which receives a collar 72 and a split adaptor ring 73 each of which have inclined wedge surfaces. Thus, when the screws 74 are tightened, radial forces are created and a radially outward force pushes the lower end of the quill sleeve 64 against the set o thrust bearings 66 and a radially inward force pushes the split adaptor ring tightly against the agitator shaft 12. In this manner, the agitator shaft 12 is supported b the bearings 66 against radial thrust loads. The split adaptor ring 73 is also provided with several jack screws 75 which are threaded into the ring 73 and which when tightened bear against the undersurface c collar 72 to effect loosening of the wedged member 72, 73.

Referring now to the lower part of FIG. 1, supporte on the mixer tank top (not shown) and projecting upwardly therefrom is a cylindrical nozzle 27 the uppe end of which is flanged outwardly as at 127. Supporte on the flange 127 is an annular gasket 28, which may preferably be contained in a Teflon envelope. Supported on gasket 28 is an annular adaptor plate 35 of corrosion-resistant material, preferably glass-lined steel. As seen in FIG. 1, adaptor plate 35 fits snugly within the circular opening in the drive stand 25. A plurality of bolts 29 pull the adaptor plate 35 down toward the nozzle flange 127, compressing the gasket 28.

Supported on and secured to the adaptor plate 34, as by bolts 76, is a housing 3 which contains the mechanical seal cartridge shown enlarged, and in section, in FIG. 2. As seen in FIG. 2, supported on the top of the mechanical seal housing 3 is a split annular top plate 40 which is fastened to the mechanical seal housing 3 by the bolts 38. Extending through holes in the plate 40 are jacking bolts 39, the lower ends of which are screwed into tapped holes 139 in an upper stationary seal face 32, preferably formed of stellite. In normal operation, the inner annular suface 140 of the split plate 40 is spaced radially from the rotating agitator shaft 12.

Upper stationary seal face 32 is provided with blind holes which receive pins 46 which support a cylindrical spacer-and-sleeve 23. Sleeve 23 extends downwardly to a lower stationary seal face 48 and supports the same on an inwardly projecting lip of the sleeve 23. The lower stationary seal face 48 extends downwardly so that its outside-diameter surface faces the inside-diameter surface of the adaptor plate 35 and is sealed thereto by an annular seal 135. By suporting the lower stationary seal face 48, sleeve 23 supports the entire mechanical seal package, since all of the components thereof are located between the upper and lower stationary seal faces 32 and 48.

As seen in FIG. 2, the spacer-and-support sleeve 23 is concentric with the axis of the agitator shaft 12 and radially outside all of the other components which make up the mechanical seal package. Sleeve 23 is sealed off from the corrosive fluid and need not be of corrosion-resistant material. Holes 132 are provided in the sleeve 23 to allow sealant to pass therethrough. A port plug 41 for the sealant is visible in FIG. 2, and sealant inlets and outlets are visible in FIG. 1.

The lower stationary seat 48 may preferably be made of ceramic. As seen best in FIG. 3, the seal face 48 is prevented from rotating with respect to the spacer-and-support sleeve 23 by a semi-circular rib 148 which is inserted in a semi-circular slot in the seal face 48 and tack welded to the sleeve 23. As previously described, the seal face 48 is supported on an inwardly extending lip at the lower end of the sleeve 23.

Secured to the agitator shaft 12, as by a set screw 47, is a spring holder 50, preferably made of stainless steel. Holder 47 has annular central hub portion which receives the set screw 47 for holding the holder 50 fixed to the agitator shaft 12 so that the holder 50 rotates therewith. Extending upwardly and downwardly from the central hub portion of spring holder 50 are collar portions 80 and 81, respectively. The collars 80 and 81 are internally ribbed or splined and are spaced radially from the agitator shaft 12 forming therebetween upper and lower annular spaces which receive the externally-splined upper and lower rotating seal faces 51 and 151, repsectively. The seal faces 51 and 151, which may preferably be made of carbon, are spring pressed against the upper and lower stationary seal faces 32 and 48, respectively, as by coil springs 54 and 154, respectively, located between the hub of holder 50 and upper and lower retaining rings 53 and 153. Each of the rotating seal faces 51 and 151 is provided with an O-ring 55 and 155, respectively. The upper O-ring 55 may preferably be made of Viton. The lower O-ring 155 may preferably be made of silicone encapsulated in Teflon.

As seen in FIG. 2 of the drawing, that portion 112 of the agitator shaft 12 to which the spring holder 50 is fixed by the set screw 47 is of larger diameter than the portions above and below.

As has already been indicated, the mechanical seal assembly provided by the present invention is a package rotary seal cartridge assembly which is removable as a unit by sliding it along the shaft. The seal unit is especially adpated for use on agitator shafts in glass-lined mixer tanks containing highly corrosive fluids or substances. It may, of course, also be used on other tanks containing less corrosive fluids. All of the component parts of the mechanical seal cartridge which are exposed to contact by the corrosive fluids are corrosion resistant, yet no expensive exotic metals such as the Hastelloys, or a minimum thereof, are required. Hence, the mechanical seal assembly of the present invention is less expensive than prior art mechanical seals which are intended for the same purposes.

In the particular illustrated embodiment, the passageway through which the corrosive fluids may pass is identified as P in FIG. 2. It will be seen that, in FIG. 2, the surfaces which are exposed to contact by the corrosive fluids consist of the following: A portion of the agitator shaft 12 (preferably having a glass coating G); the O-ring 155 (preferably silicone encapsulated in Teflon); the lower rotating seal face 151 (preferably carbon); the adaptor plate 35 (preferably glass lined); the nozzle gasket 28 (preferably enclosed in a Teflon envelope); and the tank nozzle 27 (preferably glass lined). Thus, no metal component part is exposed.

Replacement of Mechanical Seal Cartridge

The series of steps which are performed when the mechanical seal cartridge is to be removed for replacement or repair will now be described. Access openings 69 to the mechanical seal component are provided in the drive housing 60, as illustrated in FIG. 1.

To replace the mechanical seal cartridge the split top plate 40 is removed, by removing the fastening bolts 38 and the jacking bolts 39. The jacking bolts 39 may then be screwed back into the tapped holes 139 in the upper stationary seal face 46 and used to pull the mechanical seal cartridge upwardly until the lower stationary seal face 48 is above the upper end of the mechanical seal housing 3, i.e., above the position which had been occupied by the split top plate 40. The mechanical seal cartridge, which is thus moved upwardly includes the following components: The upper stationary seal face 32, the sleeve pins 46, the spacer sleeve 23, the upper rotating seal face 51, the upper O-ring 55, the upper retaining ring 53, the upper coil spring 54, the spring holder 50, the lower coil spring 154, the lower retaining ring 153, the lower rotating seal face 151, the lower O-ring 155, and the lower stationary seal face 48.

After the mechanical seal cartridge has been pulled up above the level previously occupied by the split top plate 40, the split top plate 40 is replaced, but this time it is clamped tightly about the agitator shaft 12 immediately below the shoulder 212, for the reason that the split plate 40 is to be used to support the agitator shaft 12 when its normal support is released during removal of the mechanical seal cartridge, as will be described.

The next step is to loosen the split adaptor ring 73. This is done by removing the fastening screws 74 and then tightening the jack screws 75 to break the wedge between the split adaptor ring 73 and the collar 72. The split adaptor ring 73 is then removed and the collar 72 is lowered until it rests on the mechanical seal cartridge.

The attendant next removes the cap 24 from the top of the drive housing 60, after which he removes the set of fastening screws 16. The jack screws 17 are then turned upwardly to force downwardly the lock nut 15 and the draw bar 10, thereby to loosen the tight wedge fit at the key 33 and thereby to lower the agitator shaft 12 until the split plate 40, which is clamped tightly about the shaft 12 just below the shoulder 212, reaches and abuts against the mechanical seal housing 3. The lock ring nut 15 is then unscrewed from the draw bar 10. The cap screws 14 are next removed, and the quill shaft 13 is pulled upwardly and removed. Long draw rods, threaded at their lower ends, and then lowered down through the annular space created by the removal of the quill shaft 13, and threaded into tapped holes in collar 72. The collar is then drawn up and removed. The long rods are then re-lowered and threaded into the tapped holes 139 in the upper stationary seal face 32. The entire mechanical seal cartridge is then pulled upwardly through the annular space created by the removal of the quill shaft 13. In this manner, the package mechanical seal is removed for replacement or repair.

While the mechanical seal package of the present invention has been designed primarily for glass-lined mixing tanks containing highly corrosive fluids or substances, the seal package may also be used on tanks which contain less corrosive fluids and which are not glass lined. In the latter case, the annular adaptor plate 35 need not be glass lined provided it is made of a material which is suitably resistant to corrosion by the particular fluids involved. Similarly, the lower stationary seal face 48 may, when intended for use with the less corrosive fluids, be stellite instead of ceramic.

What is claimed is:

1. A corrosion-resistant unit package mechanical seal assembly for sealing a rotatable shaft which extends through an opening in a tank wall, said seal assembly being removable as a unit by sliding movement along said shaft, said unit assembly including:
    a. a fixed annular upper stationary seal face having means for receiving the ends of draw rods for removal of said unit;
    b. a corrosion-resistant annular lower stationary seal face;
    c. a holder having an annular central hub portion and upper and lower collar portions;
    d. means securing said hub portion to said rotatable shaft at a point approximately midway between the faces of said upper and lower stationary seal faces;
    e. said upper and lower collar portions of said holder being spaced radially from said rotatable shaft forming upper and lower annular spaces therebetween;
    f. said upper and lower collar portions having internal projections;
    g. annular upper and lower rotatable seal faces within said upper and lower annular spaces and having external slots receiving said collar projections;
    h. spring means within said annular spaces forcing said upper and lower rotatable seal faces toward said upper and lower stationary seal faces, respectively;
    i. annular seal means between said lower rotatable seal face and said rotatable shaft, and
    j. an annular spacer-and-support sleeve secured to an depending from said upper stationary seal face external to said rotatable seal faces and isolated from contact by fluid from said vessel,
    k. said spacer-and-support sleeve having means at its lower end for supporting said lower stationary seal face and for preventing rotation thereof.

2. In combination; the unit package mechanical seal assembly of claim 1 in combination with an annular corrosion-resistant support member supported on the tank wall in fixed position concentric with the tank wall opening, the outside-diameter surface of said annular lower stationary seal face facing the inside-diameter surface of said annular support member and having annular sealing means therebetween.

3. The combination of claim 2 wherein said support member is glass-lined steel.

4. The combination of claim 2 wherein said lower stationary seal face is ceramic.

5. A mechanical seal cartridge for a rotatable shaft which enters a vessel through a wall opening, said cartridge including:
    a. an annular holder having a hub portion;
    b. means securing said hub portion to said shaft for rotation therewith;
    c. said hub having a first collar hub portion extending concentrically with said shaft axis in a direction toward said vessel-wall opening;
    d. said first collar being spaced radially from said shaft forming a first annular space therebetween;
    e. a first annular rotatable seal face in said first annular space;
    f. means connecting said first collar and said first rotatable seal face for rotational movement together while allowing relative movement therebetween in the axial direction of said shaft;
    g. a first annular stationary seal face positioned between said first rotatable seal face and said vessel-wall opening; and
    h. first spring means biasing said first rotatable seal face toward said first stationary seal face.

6. In combination; the mechanical seal cartridge of claim 5 in combination with an annular corrosion resistant support member supported on the tank in fixed position concentric with the tank wall opening the outside-diameter surface of said first annular stationary seal face facing the inside-diameter surface of said annular support member and having annular sealing means therebetween.

7. A mechanical seal cartridge according to claim 5 wherein there is provided:
    a. a second collar secured to said hub portion and extending concentrically with said shaft axis in a direction away from said vessel-wall opening;
    b. said second collar being spaced radially from said shaft forming a second annular space therebetween;

c. a second annular rotatable seal face in said second annular space;

d. means connecting said second collar and second rotatable seal face for rotational movement together while allowing relative movement therebetween in the axial direction of said shaft;

e. a second annular stationary seal face positioned remotely from said vessel-wall opening relative to said second rotatable seal face;

f. second spring means biasing said second rotatable seal face toward said second stationary seal face;

g. an annular spacer-and-support sleeve connecting together said first and second stationary seal faces outside said first and second rotatable seal faces; and h. means in said second stationary seal face for receiving the ends of draw rods for withdrawing said mechanical seal cartridge as a unit by sliding movement along said shaft.

8. In combination; the mechanical seal cartridge of claim 7 in combination with an annular corrosion-resistant support member supported on the tank wall in fixed position concentric with the tank wall opening, the outside-diameter surface of said first annular stationary seal face facing the inside-diameter surface of said annular support member and having annular sealing means therebetween.

9. The combination of claim 8 wherein said support member is glass-lined steel.

10. The combination of claim 9 wherein said first stationary seal face is ceramic.

* * * * *